May 10, 1960 R. M. KINKEAD ET AL 2,936,447
DIGITAL OUTPUT
Filed June 3, 1957 2 Sheets-Sheet 2
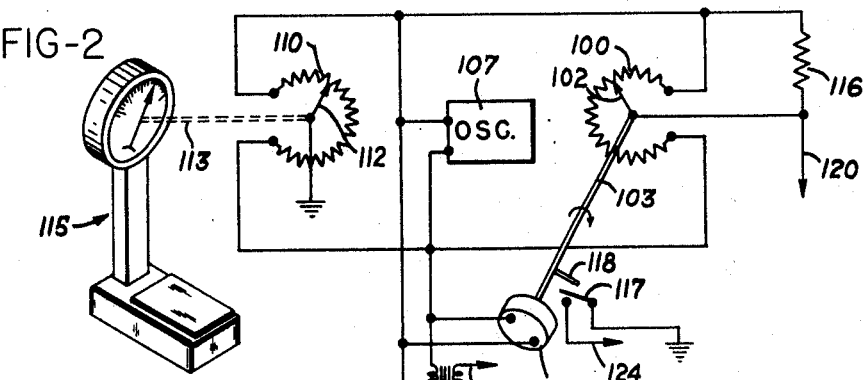
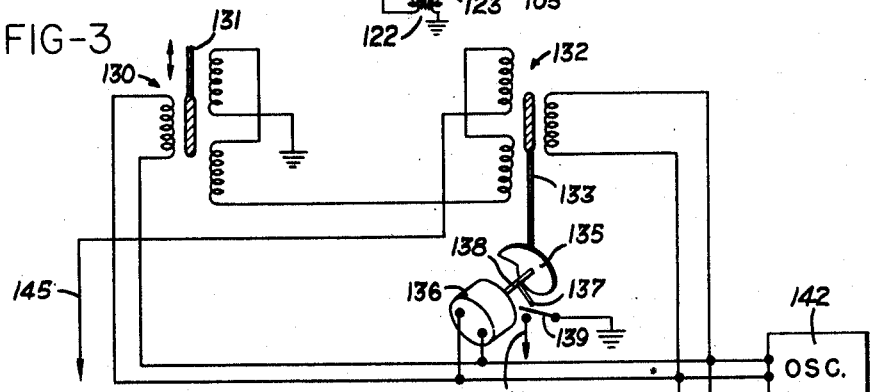
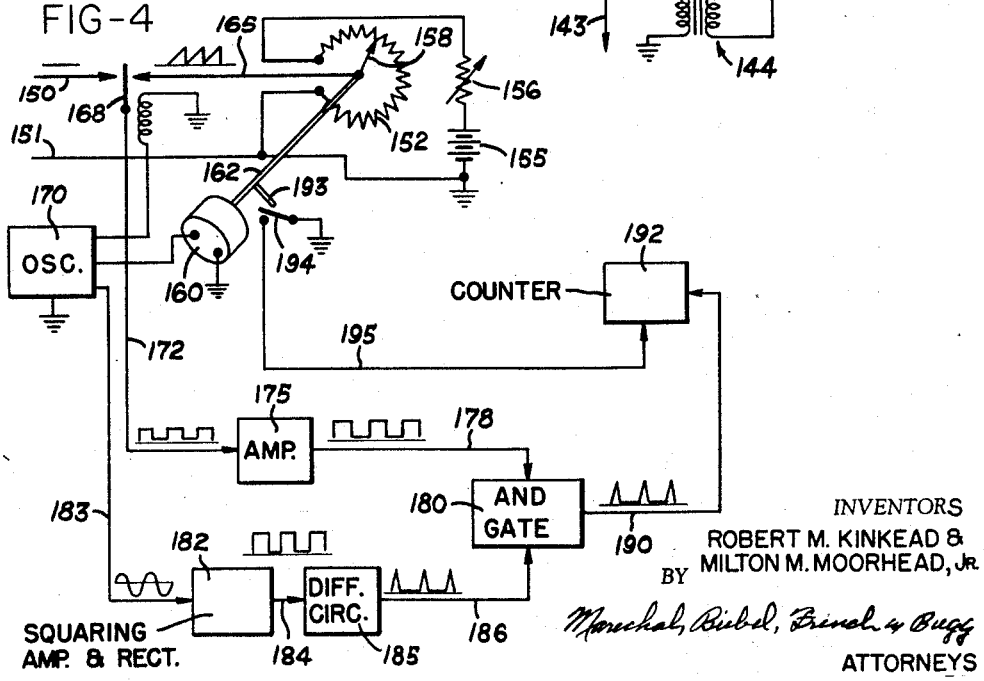
INVENTORS
ROBERT M. KINKEAD &
MILTON M. MOORHEAD, Jr.
BY
ATTORNEYS United States Patent Office 2,936,447
Patented May 10, 1960

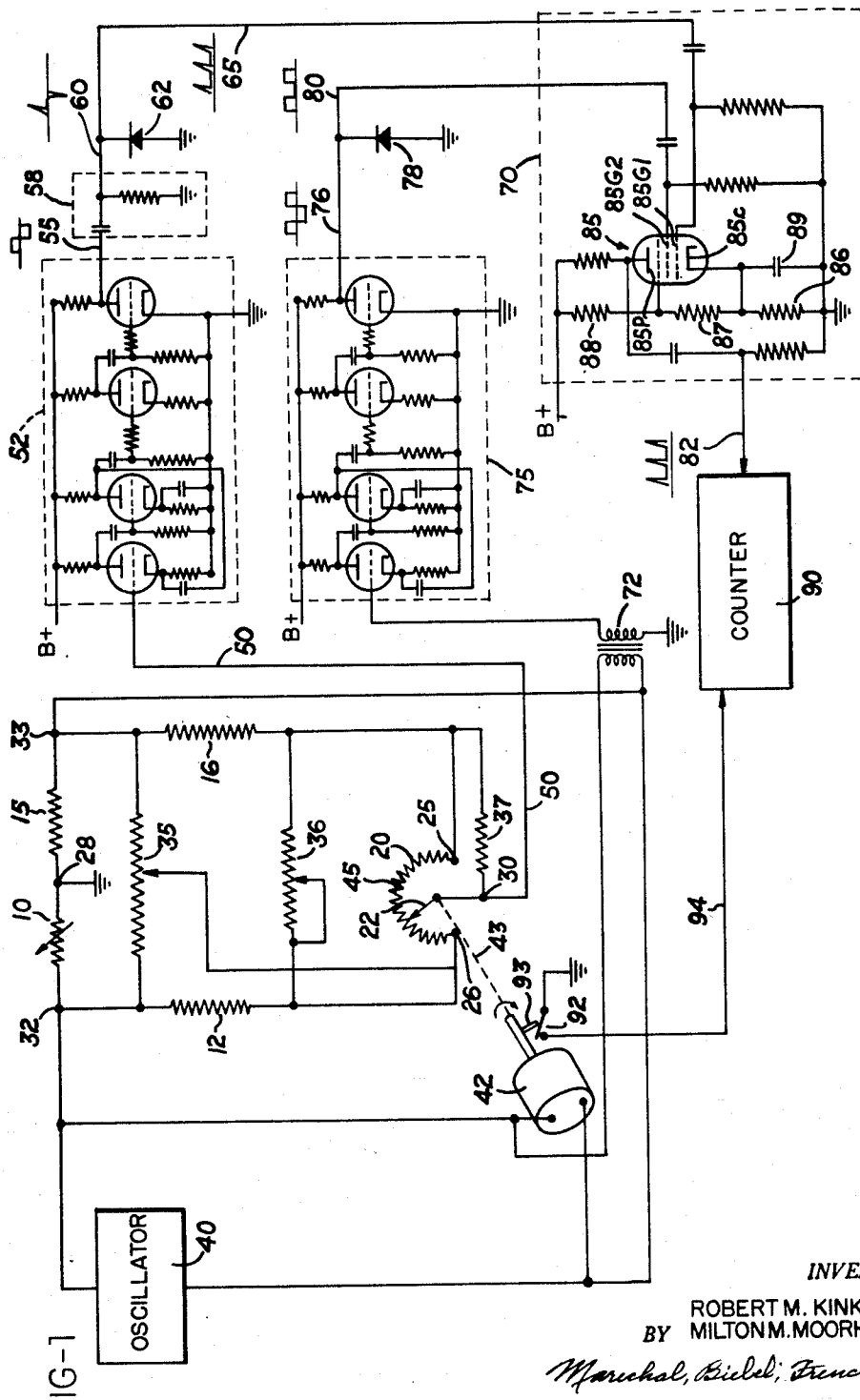

2,936,447

DIGITAL OUTPUT

Robert M. Kinkead and Milton M. Moorhead, Jr., Dayton, Ohio, assignors to Daytronic Corporation, Dayton, Ohio, a corporation of Ohio Application June 3, 1957, Serial No. 663,245

9 Claims. (Cl. 340—347)

This invention relates to apparatus and a method for measuring physical quantities such as size, tension, weight, temperature or pressure and providing a digital output which is indicative of the magnitude of such quantities.

In its simplest form the apparatus provided by this invention combines a variable transducer for providing an electrical analogue input related to the magnitude of such physical quantities with a novel analogue to digital converter, or digitizer, which then supplies trains or bursts of electrical pulses as individual signals to a further electrical to mechanical transducer for observation, recording, and/or further computation.

The novel method of converting analogue information to digital information contemplates sensing the moment of phase displacement between a pulsating signal derived from a variable voltage divider and a pulsating reference signal. The voltage divider is connected in circuit with an analogue input device, and is cyclically scanned at a rate related to the reference signal, for example by scanning apparatus driven in timed relation to the frequency of the reference signal. Then, when the phase displacement changes between the signal from the voltage divider and the reference signal, the train of output pulses is either commenced or terminated, depending upon whether the pulse train or burst is started at the beginning of the scanning cycle or stopped at the end of the cycle, and in either event the number of pulses in each is related to the magnitude of the analogue input to the circuit during that scanning cycle. These pulse trains, or bursts, coming at a rate which is in timed relation to the scanning operation, provide a digital output which may be fed to any conventional high speed digital counter, and which counter may be reset after each scanning cycle.

The primary object of this invention is, therefore, to provide a simplified and accurate high speed apparatus and method of measuring which supplies digital output information from analogue input information.

Another object of this invention is to provide improved measuring apparatus of simple design, and incorporating a minimum of moving parts, which is capable of representing physical changes in terms of digital information.

A further object of the invention is to provide a novel analogue to digital converter, or digitizer, which includes a variable voltage divider connected in circuit with an analogue input device, wherein a pulsating potential difference of predetermined frequency is derived from a device which scans the voltage divider in cyclic fashion, wherein this derived signal is compared with a base pulsating potential difference to sense the moment of phase displacement occurring when the scanner crosses that point on the voltage divider which represents a balance between the voltage divider and the analogue input device, and wherein this phase displacement is sensed by apparatus which either starts or stops a train of output pulses related in time to the scanning operation, thus to determine the number of pulses in the train between either the beginning or end of the scanning operation and the moment of phase displacement.

An additional object of the invention is to combine such above mentioned apparatus with a digital counter to observe and/or record the number of pulses in each burst related to each scanning cycle, and, if desired, to reset the counter after each scanning cycle so that the difference in count between successive cycles will represent the change in analogue input to the circuit between successive cycles.

Other objects and advantages of the invention will be apparent from the following description, the accompanying drawings and the appended claims.

In the drawings—

Fig. 1 is a diagram of suitable measuring apparatus for deriving digital output information from analogue input information provided by suitable mechanical to electrical transducers;

Figs. 2 and 3 are illustrations of suitable input transducers and modified circuits which may be incorporated in the apparatus of Fig. 1; and Fig. 4 is a diagram representing a modified digitizer for use with an unknown D.C. voltage input which may be derived from, for example, thermocouples, photocells, or other similar transducers having variable D.C. outputs.

Referring to the drawings, which illustrate preferred embodiments of the present invention in Fig. 1, a variable resistor 10 is shown as representing a suitable transducer having an analogue input. This resistor may, for example, be varied by changes in pressure from a pressure gauge when it is desired to observe and record pressures and changes in pressure in a system. Resistor 10 represents one leg of a resistance bridge circuit. One side of this resistor is grounded, and the other side is connected to a resistor 12 which represents part of a second leg of the resistance bridge circuit. A further resistor 15 represents a third leg of the bridge circuit and is connected at one end to ground, and at its other end is connected to resistor 16 which represents part of a fourth leg. A variable voltage divider, provided in the form of a rotating potentiometer 20 having a scanning member or wiper 22, is connected between resistors 12 and 16. That portion of potentiometer 20 between its one end 25 and the wiper 22 in combination with resistor 16, constitutes the fourth leg of the resistance bridge circuit while the remainder of the potentiometer between its other end 26 and wiper 22 combines with resistor 12 to complete the third leg of the resistance bridge circuit.

Accordingly, the points 28 (ground) and 30, at the connection to wiper 22, represent that part of the bridge circuit across which the potential difference will be 0 when the bridge circuit is balanced, with the exciting potential difference being applied at points 32 and 33. Potentiometers 35 and 36 are provided for manual adjustment to control the zero and span, respectively, of the potentiometer winding 20 as it relates to the values of the input quantity at resistor 10. The function of resistor 37 is explained in more detail below.

The exciting potential difference applied at points 32 and 33 is provided from a suitable oscillator 40 which also is connected to drive a synchronous motor 42, and this motor is in turn provided with a drive connection 43 to the scanner or wiper 22. Accordingly, the scanner rotates in a fixed time relation, in the illustrated case in synchronism, to the frequency of the exciting voltage. This arrangement provides, therefore, that the same number of cycles of the pulsating or oscillating voltage from oscillator 40 are required for the scanner 22 to move from the beginning of the scanning operation at point 26 to the end of the scanning cycle at point 25, even though the oscillator frequency may vary somewhat during operation. Thus the number of cycles required to go from point 26 to point 25 is known, and if the number of cycles required to go from point 26 to the point of balance 45 (arbitrarily chosen for illustration) can be determined, then the number of cycles counted during the traverse or scanning from point 26 to point 45 can be directly related to the unknown input applied by the variable resistor 10.

The voltage signal obtained from scanner 22 at point 30 is thus supplied through line 50 to a squaring amplifier 52. The details of this amplifier are shown in the drawing but will not be described in detail since they are well known to those familiar with the art. It should be noted, however, that such an amplifier has two important characteristics, namely, very high gain and a limitation of the amplitude of its output signal. Thus, amplifier 52 amplifies the input sine wave voltage considerably (several thousand times) but due to its limiting action it cuts off the greatest part of the resulting wave form and passes what approximates a square wave form, shown on the drawing above reference numeral 55 which designates the amplifier output line. The gain of the squaring amplifier is so great that it produces the wave form shown at all times during its operation in the circuit, even when the wiper or scanner 22 is at balance point 45, since there is sufficient residual voltage in the circuit to cause the amplifier to produce the amplitude and wave form shown. Accordingly, the wave form output of amplifier 52 will not vary and changes in amplitude need not be considered. The output line 55 leads to a differentiating circuit 58 which produces a wave form which is the first time derivative of the input wave form. The output from circuit 58, is, therefore, in the form of a series of positive and negative pulses or spikes illustrated over reference numeral 60 which designates the output line of circuit 58. The negative pulses are removed by the diode 62, and thus the final output through line 65 is a series of positive pulses indicated above that reference numeral.

Line 65 leads to a coincidence or gate circuit 70 which is shown for purposes of illustration as an "and" gate of a type well known in the art. The output of oscillator 40 is also coupled through transformer 72 to a further squaring amplifier 75 which is of the same construction as squaring amplifier 52, and which has the same characteristic of large gain and amplitude limiting action. The wave form passed through the output line 76 from this amplifier is shown above that reference numeral as a square wave, and the negative half of this wave form is removed by the diode 78 so that the output line 80 transmits a series of positive signals at predetermined frequency, as shown by the wave form above reference numeral 80. Line 80 also leads to the coincidence circuit 70.

Coincidence circuits of this type are well known in the art, certain of them sometimes being known as gate circuits. The purpose of the coincidence circuit is to compare the signals received from the first and second input lines 65 and 80, respectively, and to transmit through its output line 82 a train or burst of pulses only when the first and second inputs are in predetermined relation. In the illustrated example coincidence circuit 70 is shown as an "and" gate of the type using a pentode 85 having its cathode 85c maintained at a sufficiently positive potential by a voltage dividing circuit including resistors 86, 87 and 88 and condenser 89. The first control grid 85G1 is connected to receive the positive pulses from input line 65, and the second control grid 85G2 is connected to receive the positive signals from the second input line 80. With the cathode 85c maintained sufficiently positive with respect to the control grids pentode 85 is cut off and no plate current will flow normally. Under these conditions, therefore, the potential of the plate 85P remains at the value of the plate supply until a signal from input 80 and a pulse from input 65 are applied to the respective grids 85G2 and 85G1 simultaneously. When this happens plate current will flow, and the output at line 82 will be a series of pulses, one for each set of coinciding signals and pulses from the two inputs.

However, when the scanner 22 crosses the balance point 45, a phase shift occurs in the oscillating voltage obtained at point 30 with respect to the phase of the exciting voltage obtained from oscillator 40 in accordance with the well known characteristics of bridge circuits to which pulsating potential differences are applied.

As soon as this phase shift occurs the input in line 65 and input signals in line 80 no longer coincide or overlap in time, and the gate circuit will close and its output will be cut off. Thus, for example considering the scanner 22 as rotating clockwise as viewed in Fig. 1 pulses will be transmitted from the gate output 82 during that portion of the travel of the scanner from point 26 to point 45, and once the scanner crosses this balance point the phase of the pulses in gate input line 65 will be shifted 180° in time relation from the signals in input line 80. As noted above, this causes the gate circuit to cut off. Thus during rotation of the wiper arm or scanner 22 pulses are transmitted through the gate output 82 during the travel from point 26 to point 45 and from point 45 to point 25 there is no output from the gate or coincidence circuit 70. Between points 25 and 26 the scanner is not contacting the potentiometer winding, and this condition would be indeterminate except that resistor 37 provides for a small residual unbalance in the "out of phase" or "no counts" direction, insuring that there is no output from the coincidence circuit until the scanner again reaches point 26.

The coincidence circuit output 82 thus transmits digital information in the form of trains or bursts of pulses during each scanning cycle of the voltage divider 20, and the number of pulses in each such burst is directly related to the analogue input from the variable resistor 10. Since the balance point 45 will shift directly with variations in the analogue input, therefore, with shifting of the balance point there will be more or less pulses in each burst. The coincidence circuit output is fed to a conventional digital counter 90 which may be of any well known type. A reset switch 92 is positioned to be actuated by a lobe or arm 93 on the drive connection 43 from motor 42, and thus switch 92 is arranged to be actuated during the travel of the scanner between points 25 and 26. This will cause a reset pulse to be fed through line 94 to the counter 90, causing the counter to be reset to 0 at the end of each scanning cycle. The pulses counted in each burst corresponding to each scanning cycle, will, therefore, provide a digital indication of the value of the analogue input to the apparatus.

The counter 90 may be an electronic counter of a type familiar to the art, and may include well known apparatus for registering the count on a lamp panel or the like. The digital information in the counter can be readily used to actuate electric typewriters, printers, punch card equipment, or remote "scoreboard" indicators. With proper calibration and adjustment of the potentiometers 35 and 36, the total count can be made to correspond, for example, to the exact stress in p.s.i. applied to the structural member to which a strain gauge is attached for actuating the variable resistor 10.

It will be appreciated that the circuitry illustrated and above described represents but one of a number of circuits which may be used in carrying out the teachings of this invention. For example, a different type of gate circuit could be employed to compare the input signals from lines 65 and 80, and such different gate circuit could be arranged to transmit output pulses only when the two inputs were out of phase, for example, in which case the count supplied to counter 90 would represent the travel of the scanner between point 45 and point 25. In such a situation, of course, resistor 37 would be connected to supply a residual unbalance on the side of the first part of the variable voltage divider 20 to assure that counts occurred only during scanning of the latter portion of the voltage divider.

One practical embodiment of this invention is illustrated in the schematic diagram of Fig. 2, wherein a continuous variable potentiometer 100 is scanned by a scanner 102 which is in turn driven through shaft 103 by a motor 105. An oscillator 107 is connected in circuit with potentiometer 100, as is also a further variable potentiometer 110 having a wiper 112 driven, as indicated schematically at 113 by the indicating mechanism of a scale 115. As in the circuit of Fig. 1, a resistor 116 extends between scanner 102 and one end of the potentiometer 100 to provide a residual unbalance, and a switch 117 is operated by a cam or arm 118 on shaft 103 to provide a reset pulse at the end of a complete scanning cycle of potentiometer 100.

An output line 120 leads from scanner 102 to the squaring amplifier, in the same manner as line 50 in Fig. 1, while oscillator 107 is connected through transformer 122 and output line 123 to a squaring amplifier, in the same manner as the connection between transformer 72 and amplifier 75 in Fig. 1. The reset pulses are transmitted through line 124 to the counter in the same fashion as the connection of line 94 in Fig. 1. It will be apparent from comparison with Fig. 1 that the connection of the squaring amplifiers, differentiating circuit, and gate circuit to the digital counter may be accomplished in the same manner as shown therein.

Another embodiment of the invention is shown in Fig. 3, wherein the analogue input to the circuit is provided through a differential transformer 130, as by imparting motion to the movable core 131 thereof. A further differential transformer 132 provides the continuously variable voltage divider apparatus which is scanned, for instance by moving the core 133 thereof by a revolving cam 135 driven by synchronous motor 136. The cam surface preferably is designed to operate the core 133 in a linear fashion, and again an arm 137 on the motor drive shaft 138 is arranged to actuate switch 139 for providing a reset pulse at the end of a scanning cycle, such pulse being transmitted through line 140. The circuit is excited by an oscillator 142, and one of the squaring amplifiers is driven through output line 143 and transformer 144 directly from the oscillator (as in Fig. 1) while the other squaring amplifier receives a signal from differential transformer 132 through output line 145. Again, comparison of these two outputs to determine the point of balance is in the same manner as in Fig. 1.

The present invention may also be applied in situations where it is desired to measure signals in terms of D.C. voltages from sources having variable D.C. outputs. Such sources might be, for example, thermocouples, pH meters, photocells, batteries, or the like. A circuit suitable for measurement of such variable D.C. signals is shown in Fig. 4.

In this circuit the variable or unknown D.C. voltage is applied across lines 150 and 151, and line 151 is connected to one side of a continuously variable voltage divider such as the illustrated potentiometer 152. This potentiometer is excited by a battery 155 through an adjustable resistor 156, and is scanned by a suitable scanner 158 driven by a synchronous motor 160 through shaft 162. The wiper or scanner 158 picks off from potentiometer 152 a voltage that increases linearly as a sawtoothed wave form as the rotational cycle is completed. This voltage is transmitted through output line 165, and the wave form is illustrated above that line.

The unknown input voltage, from line 150, and the voltage from line 165 are sampled alternately by a synchronous chopper 168 driven by an oscillator 170 which also drives motor 160. The chopper switches back and forth between lines 150 and 165 in synchronism with the A.C. driving voltage from oscillator 170, and has the characteristic of a very high percentage of "dwell" time. In other words, the time required for the chopper to travel from one contact to the other is a very small percentage of the total time in the cycle. Furthermore, since the time period of the chopper is very short as compared to the time required for a significant change in either of the two voltages being sampled, the output of the chopper through line 172 is essentially a square wave, as indicated by the wave form above that line in Fig. 4. This signal is transmitted to a squaring amplifier 175, of the same type as shown at 52 in Fig. 1. The square wave signal to amplifier 175 becomes smooth and without variation, however, when the chopper switches between two identical voltages.

Since the action of chopper 168 is synchronous, when the output voltage from potentiometer wiper 158 is less than the unknown voltage on line 150 a square wave output is obtained at line 172, and when the voltage in line 165 becomes equal to the one known voltage in line 150 the chopper output is smooth. Then, when the potentiometer voltage becomes greater than the unknown a square wave is once more obtained in output line 172, but a 180° phase shift has occurred. The amplified square wave signal from amplifier 175 is transmitted through line 178 to a gate circuit 180 of the same type as shown at 70 in Fig. 1.

A further squaring amplifier and rectifier circuit 182 receives an oscillating signal from the oscillator 170 through line 183 and transmits an amplified square wave signal through line 184 to the differentiating circuit 185. The output 186 of this circuit thus transmits a series of spikes or pulses as shown by the wave form above this line to the gate circuit 180, and these pulses may be in or out of phase with the rectified square wave signal in line 178, depending upon whether the scanner 158 has reached or passed the balance point. Thus, a train or series of pulses is transmitted through the gate output 190, related in number to the magnitude of the D.C. input signal. These pulses are fed to counter 192. In the same manner as previously described, an arm 193 on motor shaft 162 is arranged to operate a switch 194 and supply a reset pulse through line 195 to the counter at the end of each scanning cycle.

It is seen, therefore, that the present invention provides a simplified analogue to digital converter, or digitizer, which is operable at relatively high speeds, which contains a minimum of moving parts subject to wear, and which is extremely accurate. This digitizer may be used in any number of practical applications, such as for example, various types of measuring apparatus mentioned above. It should be understood, however, that the present invention is not confined to measuring systems but is applicable to convert an analogue signal to an equivalent digital representation.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A digitizer for converting an analogue input to an equivalent digital output, comprising an input means for receiving an analogue signal varying with a quantity to be measured, a variable voltage divider including scanning means arranged to sweep said voltage divider cyclically, circuit means including said input means and said scanning means connected to compare signals from said input means and said scanning means, means for obtaining a pulsating potential difference signal from said circuit, means providing a reference source of pulsating potential difference, means operating said reference source and said scanning means in timed relation, means for sensing a time phase shift between said reference source means and said signal obtained from said circuit, and means operated by said phase shift sensing means for producing a train of pulses at a rate related to the frequency of said reference source during the time period between sensing of said phase shift and one end of a cycle of said scanning means to provide a train of pulses related in number to the magnitude of the received analogue input signal.

2. A digitizer for converting an analogue input to an equivalent digital output, comprising an input device for receiving an analogue signal varying with a quantity to be measured, a variable voltage divider including scanning means arranged to sweep said voltage divider cyclically over its entire range, circuit means including said input means and said scanning means connected to compare signals from said input means and said scanning means, means for obtaining from said circuit a signal in the form of a pulsating potential difference, means providing a reference source of pulsating potential difference, means operating said reference source and said scanning means in timed relation to each other, gate means having a first input connection from said scanning means and a second input connection from said reference source means, and an output connection on said gate means for transmitting a train of pulses as a digital output related in number to the magnitude of the received analogue signal whenever said pulsating signals passed to said one input connection coincide in time with the pulsating potential difference signal in the other of said input connections.

3. Measuring apparatus having a digital output, comprising the combination of means providing an analogue input signal related to changes in the subject under measurement, a variable voltage divider including scanning means arranged to sweep said voltage divider cyclically, circuit means including said input means and said scanning means connected to compare signals from said input means and said scanning means, means for obtaining from said circuit a signal in the form of a pulsating potential difference, means providing a reference source of pulsating potential difference, means operating said reference source and said scanning means in timed relation, coincidence circuit means having a first input from said reference source means and a second input from said scanning means, said coincidence circuit means being operable to sense the moment of balance between said input means and said voltage divider at which the phase relation between the signals from said circuit and said reference source means shifts through substantially 180°, said coincidence means also including an output connection arranged to transmit a train of output pulses at a rate related to the frequency of said reference source means during the time period between sensing of said phase shift and one end of the cycle of said scanning means, and a digital counter connected to said output connection for receiving and counting each train of pulses therefrom.

4. Measuring apparatus having a digital output, comprising the combination of means providing an analogue input signal related to changes in the subject under measurement, a variable voltage divider including scanning means arranged to sweep said voltage divider cyclically, circuit means including said input means and said scanning means connected to compare signals from said input means and said scanning means, means for obtaining from said circuit a signal in the form of a pulsating potential difference, means providing a reference source of pulsating potential difference, means operating said reference source and said scanning means in timed relation, coincidence circuit means having a first input from said reference source means and a second input from said scanning means, said coincidence circuit means being operable to sense the moment of balance between said transducer and said voltage divider at which the phase relation between the signals from said circuit and said reference source means shifts through substantially 180°, said coincidence means also including an output connection arranged to transmit a train of output pulses at a rate related to the frequency of said reference source means during the time period between sensing of said phase shift and one end of the cycle of said scanning means, a digital counter connected to said output connection for receiving and counting each train of pulses therefrom, and means for resetting said counter at the end of each cycle of operation of said scanning means.

5. Measuring apparatus having a digital output, comprising a combination of a bridge circuit having an input transducer connected in one side thereof for sensing changes in the subject under measurement and providing an analogue input to said circuit, a variable voltage divider connected in the other side of said bridge circuit for balancing the circuit by manipulation thereof, scanning means arranged to sweep said voltage divider cyclically and thus to pass over the point of circuit balance thereon during each cycle of operation, an oscillator connected to impress an oscillating potential difference upon said bridge circuit, synchronous motor means driven in timed relation with said oscillator, a gate circuit having first and second input connections, means connecting said scanning means to said first input connection for supplying pulsating signals to said gate circuit, a connection between said oscillator and said second input connection for supplying an oscillating reference signal to said gate means, said gate means including an output connection and being arranged to transmit a train of pulses through said output connection in timed relation to the operation of said scanning means during the time period between one end of the operational cycle of said scanning means and the moment at which said scanning means crosses the balance point of said bridge circuit and the phase relation between said pulsating signals in said first input connection and said oscillating signal in said second input connection shifts through substantially 180°, and a counter connected to said output connection for receiving the pulses transmitted therethrough as a digital output.

6. A digitizer for converting an analogue input to an equivalent digital output comprising input means including a synchronous chopper for receiving an analogue signal, a variable voltage divider including scanning means arranged to sweep said voltage divider cyclically, circuit means including said input means and said chopper connected to compare signals from said input means and said chopper, means providing a reference source of pulsating potential difference, means operating said scanning means and said chopper and said reference source in timed relation, said chopper being connected to sample alternately signals from said input means and said scanning means and having an output for transmitting a pulsating signal which is a composite of the sampled signals, means for sensing a time phase shift between said reference source means and said composite output signal from said chopper, and means operated by said phase shift sensing means for producing a train of pulses at a rate related to the frequency of said reference source during the time period between sensing of said phase shift and one end of a cycle of said scanning means to provide a train of pulses related in number to the magnitude of the received analogue input signal.

7. Measuring apparatus having a digital output, comprising the combination of input means including a first variable voltage divider, means for varying said first voltage divider in accordance with changes in the subject under measurement to provide an analogue input signal, a second variable voltage divider including scanning means arranged to sweep said second voltage divider cyclically, circuit means including said input means and said scanning means connected to compare signals from said input means and said scanning means, means for obtaining from said scanning means a signal in the form of a pulsating potential difference, means providing a reference source of pulsating potential difference, means operating said reference source and said scanning means in timed relation, coincidence circuit means having a first input from said reference source means and a second input from said scanning means, said coincidence circuit means being operable to sense the moment of balance between said transducer and said voltage divider at which the phase relation between the signals from said circuit and said reference source means shifts through substantially 180°, said coincidence means also including an output connection arranged to transmit a train of output pulses at a rate related to the frequency of said reference source means during the time period between sensing of said phase shift and one end of the cycle of said scanning means, and a digital counter connected to said output connection for receiving and counting each train of pulses therefrom.

8. Measuring apparatus of the character described having means for converting analogue input information into digital output information, comprising an analogue input device producing a signal variable in relation to variations in the subject of measurement, a continuously variable voltage divider including cyclically operable scanning means therefor connected in circuit with said input device, a signal generator connected to supply a pulsating signal into said circuit, means holding said signal generator and said scanning means in timed relation to each other, output means connected to receive the pulsating signal from said generator, and gate means in the connection between said output and said signal generator, said gate means being connected to receive a second pulsating signal from said circuit and being arranged to prevent the passage of pulses from said pulse generator to said output means during that portion of the cycle of said scanning means between one end thereof and the position of said scanning means whereat said circuit is balanced.

9. An analogue to digital converter comprising a balanced circuit including in one part thereof a first variable voltage divider, means connecting said first voltage divider to a variable input for providing an analogue input to said circuit, a second variable voltage divider in an opposite part of said circuit, an oscillator connected to said circuit for exciting the same, scanning means on said second voltage divider for varying the same to pass through a position where the proportions of said first and second voltage dividers in said circuit are balanced, means for maintaining said oscillator and said scanning means in synchronous relation, gate means having a first input connection with said oscillator and a second input connection with said scanning means, said gate means being arranged to provide for passage of pulses therethrough only when the separate signals fed thereto through said first and second connections are coinciding in time, and said gate means including an output connection for transmitting digital output information in the form of a train of pulses related in number to the magnitude of the analogue input during the open status of said gate means.

References Cited in the file of this patent

UNITED STATES PATENTS

| | | |
|---|---|---|
| 2,547,926 | Cook | Apr. 10, 1951 |
| 2,631,778 | Piper et al. | Mar. 17, 1953 |
| 2,633,019 | Albrecht et al. | Mar. 31, 1953 |
| 2,732,713 | Willits | Jan. 31, 1956 |

OTHER REFERENCES

Shulman: Accurate Tachometry Methods With Electronic Counters, Communications and Electronics, November 1954 (pages 452–455).

Braymer: Analog to Digital Conversion, Proceedings of the 1956 Symposium on Automatic Data Logging Systems; Philadelphia, Pa., November 1956 (notes Figs. 2 and 3).